US010731730B2

(12) United States Patent
Potthoff et al.

(10) Patent No.: US 10,731,730 B2
(45) Date of Patent: Aug. 4, 2020

(54) TRANSMISSION IN PARTICULAR FOR WIND POWER GENERATORS

(71) Applicant: RENK AKTIENGESELLSCHAFT, Augsburg (DE)

(72) Inventors: Markus Potthoff, Wettringen (DE); Andreas Boeckemeyer, Ibbenbüren (DE)

(73) Assignee: RENK Aktiengesellschaft, Augsburg (DE)

( * ) Notice: Subject to any disclaimer, the term of this patent is extended or adjusted under 35 U.S.C. 154(b) by 91 days.

(21) Appl. No.: 15/983,965

(22) Filed: May 18, 2018

(65) Prior Publication Data

US 2018/0372186 A1 Dec. 27, 2018

(30) Foreign Application Priority Data

May 19, 2017 (DE) .......................... 10 2017 110 966

(51) Int. Cl.
*F16H 1/28* (2006.01)
*F03D 9/25* (2016.01)
(Continued)

(52) U.S. Cl.
CPC ............ *F16H 1/2809* (2013.01); *F03D 9/25* (2016.05); *F03D 15/00* (2016.05); *F03D 15/10* (2016.05);
(Continued)

(58) Field of Classification Search
None
See application file for complete search history.

(56) References Cited

U.S. PATENT DOCUMENTS 2,688,263 A * 9/1954 Rockwell .................. F16H 1/28
475/338
6,770,007 B2 * 8/2004 Fox ....................... F16C 19/386
475/348
(Continued)

FOREIGN PATENT DOCUMENTS

DE 199 17 605 1/2001
DE 100 43 591 2/2002
(Continued)

OTHER PUBLICATIONS

EPO Written Opinion, dated Oct. 24, 2018 EP18172978 (Year: 2018).*
(Continued)

*Primary Examiner* — Colby M Hansen
(74) *Attorney, Agent, or Firm* — Cozen O'Connor

(57) ABSTRACT

A transmission in particular for wind power generators, with an epicyclic planetary gear arrangement having a sun gear, a ring gear, multiple planet gears and a planet carrier. The planet gears have planet gear teeth in mesh with sun gear teeth and ring gear teeth. Each planet gear is rotatably mounted via a radial slide bearing on a planet pin that is non-rotatably connected to the planet carrier. Each slide bearing includes a bearing hub positioned between the planet pin and the planet gear, which is non-rotatably connected to the planet pin. Between the bearing hub and the planet pin an annular support is formed, which seen in the axial direction has a smaller dimension than the bearing hub and/or a smaller dimension than the planet gear teeth of the planet gear.

9 Claims, 4 Drawing Sheets

(51) Int. Cl.
- *F03D 15/00* (2016.01)
- *F03D 80/70* (2016.01)
- *F16C 17/02* (2006.01)
- *F16C 27/02* (2006.01)
- *F16H 57/08* (2006.01)
- *F03D 15/10* (2016.01)
- *F16C 17/18* (2006.01)
- *F16H 57/02* (2012.01)

(52) U.S. Cl.
CPC ............. *F03D 80/70* (2016.05); *F16C 17/02* (2013.01); *F16C 27/02* (2013.01); *F16H 1/2836* (2013.01); *F16H 57/082* (2013.01); *F05B 2260/40311* (2013.01); *F16C 17/18* (2013.01); *F16C 2360/31* (2013.01); *F16H 2057/02078* (2013.01); *F16H 2057/085* (2013.01)

(56) References Cited

U.S. PATENT DOCUMENTS

| | | |
|---|---|---|
| 2012/0114488 A1 | 5/2012 | Giger |
| 2013/0237370 A1* | 9/2013 | Smith .................. F16C 35/063 475/348 |
| 2013/0337968 A1* | 12/2013 | Kleine-Brockhoff ....................... F16H 57/082 475/331 |
| 2014/0004992 A1* | 1/2014 | Weist ...................... F16H 57/08 475/331 |
| 2016/0032968 A1 | 2/2016 | Lueck |
| 2017/0356493 A1 | 12/2017 | Kruhöffer et al. |

FOREIGN PATENT DOCUMENTS

| | | | |
|---|---|---|---|
| DE | 10 2015 201248 | * | 6/2016 |
| DE | 102015201248 B3 | | 6/2016 |
| EP | 2980427 | | 2/2016 |
| EP | 2980427 A1 | * | 2/2016 |
| GB | 612883 | | 11/1948 |
| GB | 612883 A | * | 11/1948 |
| WO | WO 2009/141140 | | 11/2009 |
| WO | WO 2009/141140 A2 | * | 11/2009 |

OTHER PUBLICATIONS

Search Report dated Mar. 10, 2020 issued in European Patent Application No. 18172978.1.

* cited by examiner

TRANSMISSION IN PARTICULAR FOR WIND POWER GENERATORS

BACKGROUND OF THE INVENTION

1. Field of the Invention

The invention relates to a transmission in particular a transmission for wind power generators.

2. Description of the Related Art

From DE 100 43 593 B4 and from DE 199 17 605 B4 transmissions for wind power generators with a planetary gear arrangement are known. Transmissions known from this prior art each comprise a planetary gear arrangement designed as a multi-stage planetary gear arrangement with a sun gear, a ring gear, and multiple planet gears. First planet gears mesh with the ring gear and second planet gears mesh with the sun gear.

SUMMARY OF THE INVENTION

One aspect of the present invention is based on creating a new type of transmission for in particular wind power generators. The transmission according to one aspect of the invention comprises an epicyclic planetary gear transmission arrangement consisting of a sun gear, a ring gear, multiple planet gears, and a planet carrier, wherein the planet gears have planet gear teeth, which are in mesh with sun gear teeth and ring gear teeth. The transmission according to the invention, furthermore, comprises radial slide bearings, wherein each planet gear is rotatably mounted on a planet pin that is non-rotatably connected to the planet carrier via in each case a radial slide bearing, and wherein each radial slide bearing comprises a bearing hub positioned between the respective planet pin and the respective planet gear, which is non-rotatably connected to the planet pin. Between the respective bearing hub and the respective planet pin an annular support is formed which seen in the axial direction has a smaller dimension than the respective bearing hub and/or a smaller dimension than the planet gear teeth of the respective planet gear.

The transmission according to the invention does not utilise a multi-stage planetary gear arrangement but rather an epicyclic planetary gear arrangement. In the case of such an epicyclic planetary gear arrangement, the planet gear teeth of each planet gear on the one hand are in mesh with the ring gear teeth of the ring gear and on the other hand with the sun gear teeth of the sun gear, wherein the planet gears are mounted via radial slide bearings on planet pins which are non-rotatably connected to the planet carrier.

The radial slide bearings comprise bearing hubs positioned between the respective planet pin and the respective planet gear and which are non-rotatably connected to the planet pin that is non-rotatably connected to the planet carrier.

In the transmission according to the invention, an annular support is formed between the respective bearing hub of the respective radial slide bearing and the respective sliding pin. Seen in the axial direction, this annular support has a smaller dimension than the respective bearing hub of the respective slide bearing and/or a smaller dimension than the planet gear teeth of the respective planet gear.

The respective bearing hub can be elastically deformed in the radial direction in those regions in which the annular support is not formed. Because of this it can be ensured that under load the intermeshing teeth optimally lie against one another and the load distribution in the intermeshing teeth is thus optimised. In the respective radial slide bearing, a so-called edge loading is avoided. A correction of the microgeometry of the teeth of planet gears, sun gear and/or ring gear or of the radial slide bearings mounting the planet gears can thereby be substantially reduced or avoided.

According to an advantageous further development, the annular support, based on the axial dimension of the respective bearing hub and/or the axial dimension of the planet gear teeth of the respective planet gear is formed off centre. Seen in the axial direction an out-of-centre arrangement of the annular support is particularly preferred for optimising the load distribution in the intermeshing teeth and in the radial slide bearings.

According to an advantageous further development, the annular support is formed by a protrusion of the respective bearing hub circulating in the circumferential direction, which supports itself on the respective planet pin, and/or by a protrusion of the respective planet pin circulating in the circumferential direction, which supports itself on the respective bearing hub. This design of the annular support is simple and allows an advantageous assembly.

According to an advantageous further development, a floating bush is positioned between the respective bearing hub and the respective planet gear, which relative to the respective bearing hub and the respective planet gear is rotationally moveable. Alternatively or additionally, a slide bearing bush is positioned between the respective bearing hub and the respective planet gear which is non-rotatably connected to the respective bearing hub or to the respective planet gear. The slide bearing bush can preferentially replace a coating of the bearing hub with a slide bearing material.

According to an advantageous further development, at least one recess extending in the axial direction is introduced into the respective planet pin. By way of the recess of the respective planet pin extending in the axial direction, the planet pin can be embodied lighter and more resiliently while the oil supply of the respective radial slide bearing can additionally take place via the recess.

According to an advantageous further development, axial bearings for axially mounting the respective planet gear on the respective bearing hub are present. By way of the axial bearings, the planet gears can be axially guided on the respective planet pins.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Preferred further developments of the invention are obtained from the subclaims and the following description. Exemplary embodiments of the invention are explained in more detail by way of the drawing without being restricted to this. There it shows:

DETAILED DESCRIPTION OF THE PRESENTLY PREFERRED EMBODIMENTS

The invention relates to a transmission for in particular wind power generators. Preferentially, the transmission according to the invention is a wind power generator transmission.

The transmission according to the invention comprises a planetary gear arrangement designed as epicyclic planetary gear arrangement 1.

Figure 7:
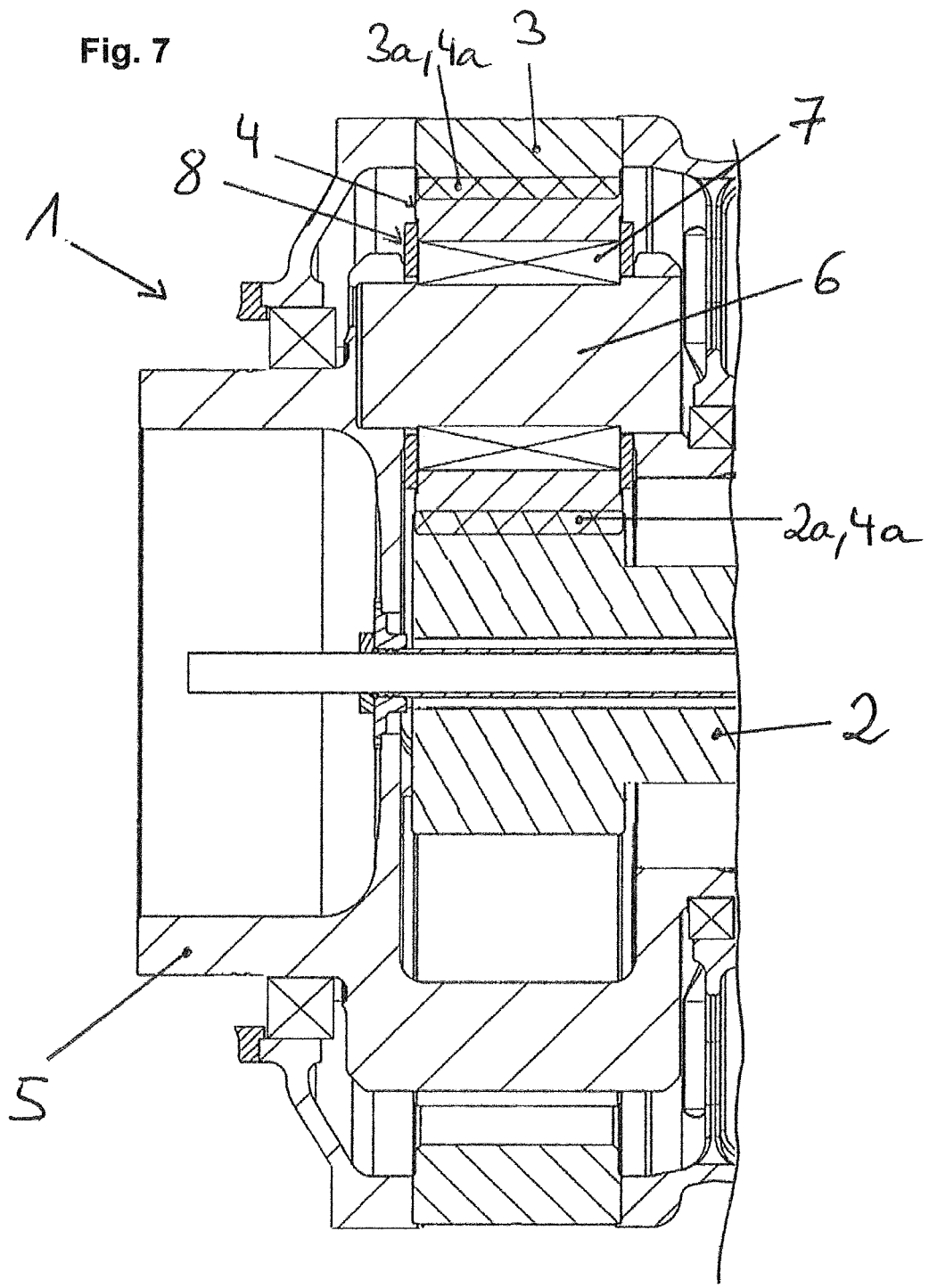
FIG. 7 is a rotary planet gear arrangement.

The epicyclic planetary gear arrangement 1 (see FIG. 7) comprises a sun gear 2, a ring gear 3, and multiple planet gears 4, wherein the planet gears 4 are received on a planet carrier 5 via planet pins 6.

In an epicyclic planetary gear arrangement 1 the ring gear 3 is preferentially stationary, the planet carrier 5 is preferentially driven and rotatable relative to a housing 19. The planet carrier 5, the planet gears 4 and sun gear 2 accordingly rotate preferentially relative to the stationary ring gear 3 and stationary housing 19.

The planet gears 4 are mounted onto the planet pins 6 connected in a fixed manner to the planet carrier 5. Mounting the planet gears 4 on the respective planet pins 6 is effected via radial slide bearings 7 and an axial bearing 8.

Figure 1:
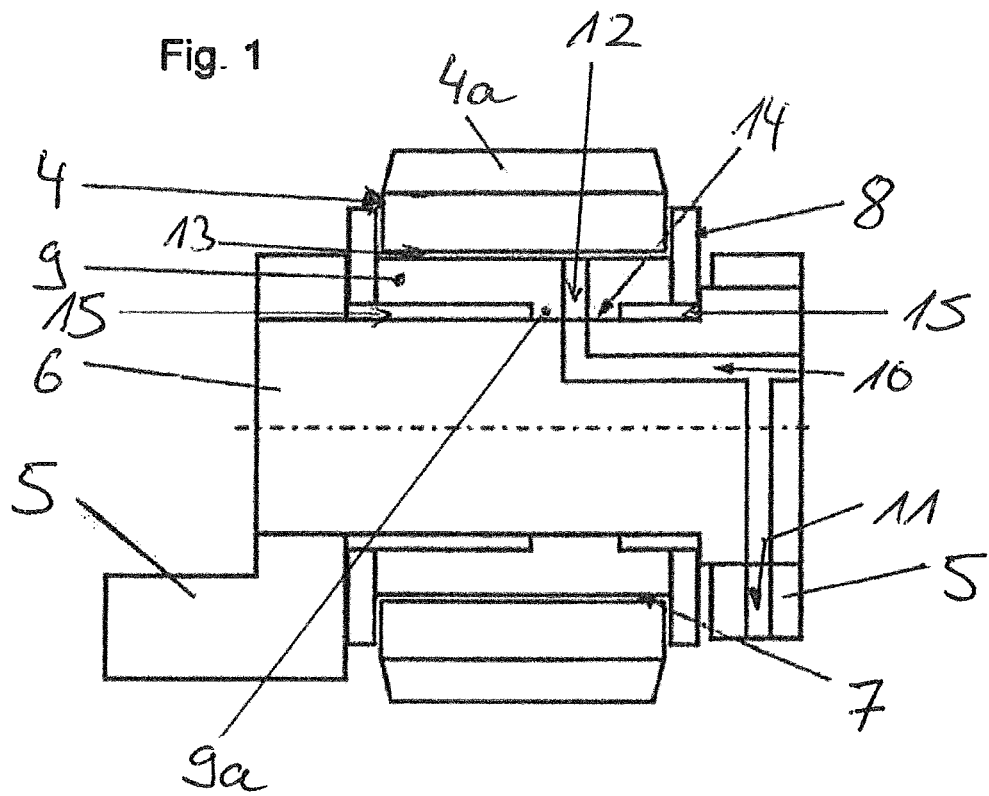
FIG. 1 is a detail of a transmission.

FIG. 1 shows an extract from a first transmission according to the invention, namely in the region of a planet gear 4 of an epicyclic planetary gear arrangement 1 of the transmission, wherein the planet gear 4 is mounted on the planet carrier 5, namely on the respective planet pin 6 that is non-rotatably fastened to the planet carrier 4, which extends on both sides through apertures in the planet carrier 5. As already explained, the planet carrier 5 is a rotatingly driven assembly to which the planet pin 6 shown in FIG. 1 is non-rotatably connected and accordingly rotates together with the planet carrier 5 during the operation. The planet gear 4 shown in FIG. 1 comprises planet gear teeth 4a, which are in mesh with teeth 2a, 3a of the sun gear 2 and of the ring gear 3 of the epicyclic planetary gear arrangement 1.

The planet gear 4 shown in FIG. 1 is rotatably mounted on the planet pin 6 shown in FIG. 1 via the radial slide bearing 7, wherein the radial slide bearing 7 comprises a bearing hub 9 which is non-rotatably connected to the planet pin 6. In the exemplary embodiment shown in FIG. 1, recesses 10, 11 are introduced both into the planet carrier 5 and also into the planet 6, which serve as conduits for lubricating oil, which can be supplied via a suitable recess 12 of the bearing hub 9 to a lubricating gap 13 between the bearing hub 9 and the planet gear 4.

The planet gear 4 can rotate relative to the planet pin 6 and relative to the bearing hub 9 that is non-rotatably connected to the planet pin 6. The axial mounting of the planet gear 4 on the planet pins 6 is effected by the respective axial bearing 8.

Between the bearing hub 9 of the radial slide bearing 7 and the planet 6 an annular support 14 is formed which circulates in the circumferential direction. Seen in the axial direction, this annular support 14 has a smaller dimension than the bearing hub 9 and/or a smaller dimension than the planet gear teeth 4a. In the shown preferred exemplary embodiment, the axial dimension of the annular support 14 circulating in the circumferential direction is smaller than the axial extent of the bearing hub 9 and smaller than the axial extent of the planet gear 4 and thus of the planet gear teeth 4a.

Accordingly, seen in the axial direction, a gap 15 is formed on both sides of the annular support 14 between planet pin 6 and bearing hub 9. Utilising this gap 15, the bearing hub 9 can be elastically deformed due to the forces and moments acting on the same during the operation. Accordingly, the bearing hub 9 is arranged in a radially flexible and non-rotatable manner on the planet pin 6.

In the exemplary embodiment shown in FIG. 1, the annular support 14, based on the axial dimension of the bearing hub 9 and the axial dimension of the planet gear teeth 4a is formed off centre. This is particularly preferred for optimising the load distribution in the intermeshing teeth and in the radial slide bearings.

In the exemplary embodiment shown in FIG. 1, the annular support 14 is provided by a protrusion 9a of the bearing hub 9 circulating in the circumferential direction, which is formed on the side of the bearing hub 9 facing away from the planet gear 4 and which supports itself on an outer contour of the planet pin 6.

Figure 2:
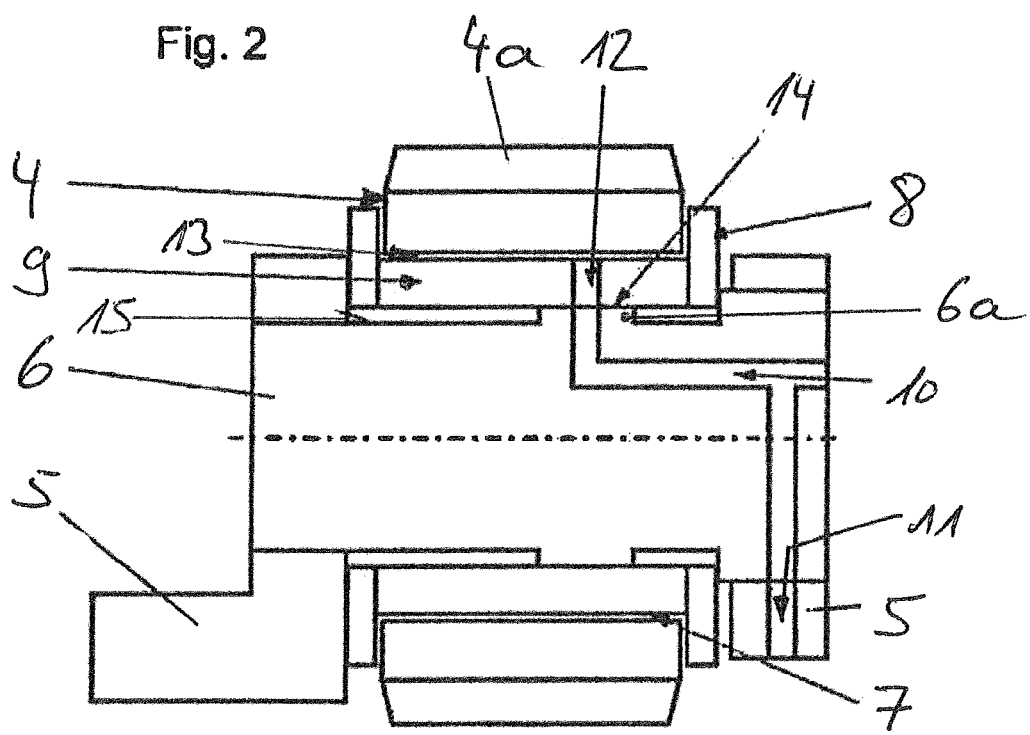
FIG. 2 is a detail of a transmission.

FIG. 2 shows a version in which the annular support 14 is formed by a protrusion 6a of the planet pin 6 circulating in the circumferential direction which, based on the radially outer circumferential surface of the planet pin 6 extends radially to the outside in the direction of the bearing hub 9 and supports itself on the bearing hub 9.

Figure 3:
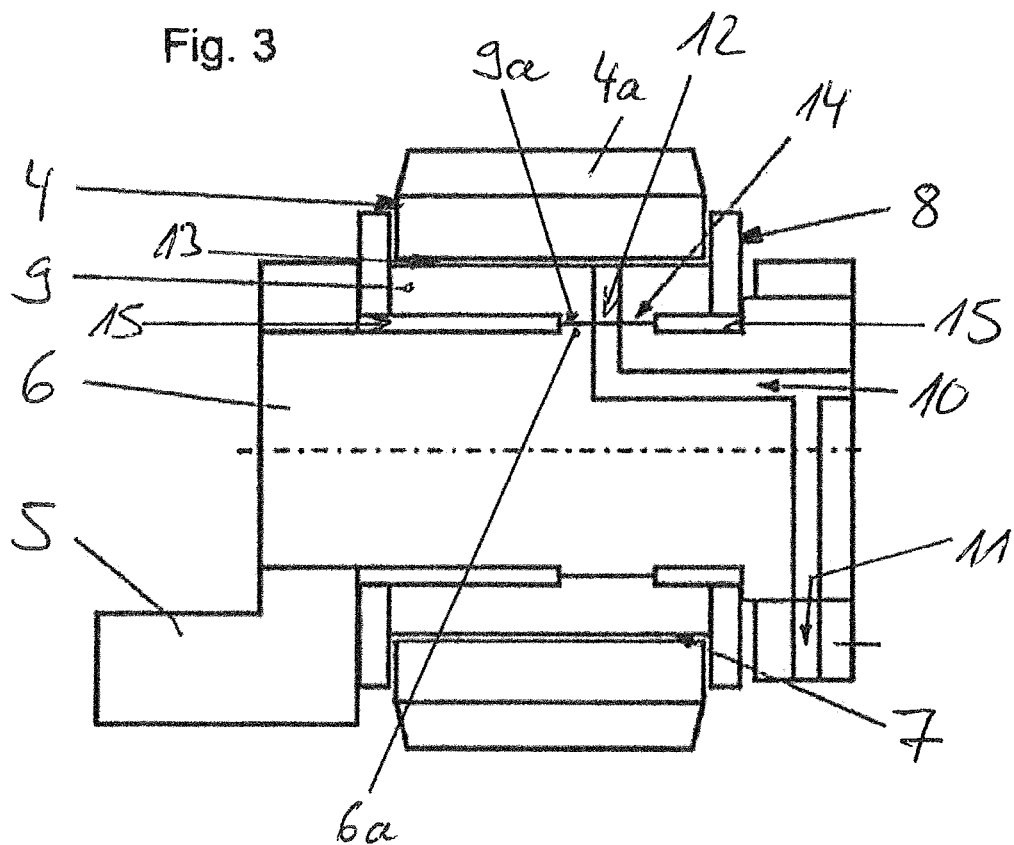
FIG. 3 is a detail of a transmission.

In the exemplary embodiment of FIG. 3, both the bearing hub 9 comprises the protrusion 9a extending radially to the inside and planet pins 6 the protrusion 6a extending radially to the outside, wherein these two protrusions 9a, 6a circulating in the circumferential direction support themselves on one another and jointly provide the annular support 14 between bearing hub 9 and planet pin 6.

With respect to all remaining details, the exemplary embodiments of FIG. 2, 3 correspond to the exemplary embodiment of FIG. 1 so that for avoiding unnecessary repetitions same reference numbers are used for same assemblies and reference is made to the explanations regarding the exemplary embodiment of FIG. 1.

In the exemplary embodiments of FIGS. 1, 2 and 3, the bearing hub 9 preferentially comprises a coating of a slide bearing material on the side facing the planet gear 4. Alternatively, the bearing hub 9 is entirely produced form a slide bearing material.

Figure 4:
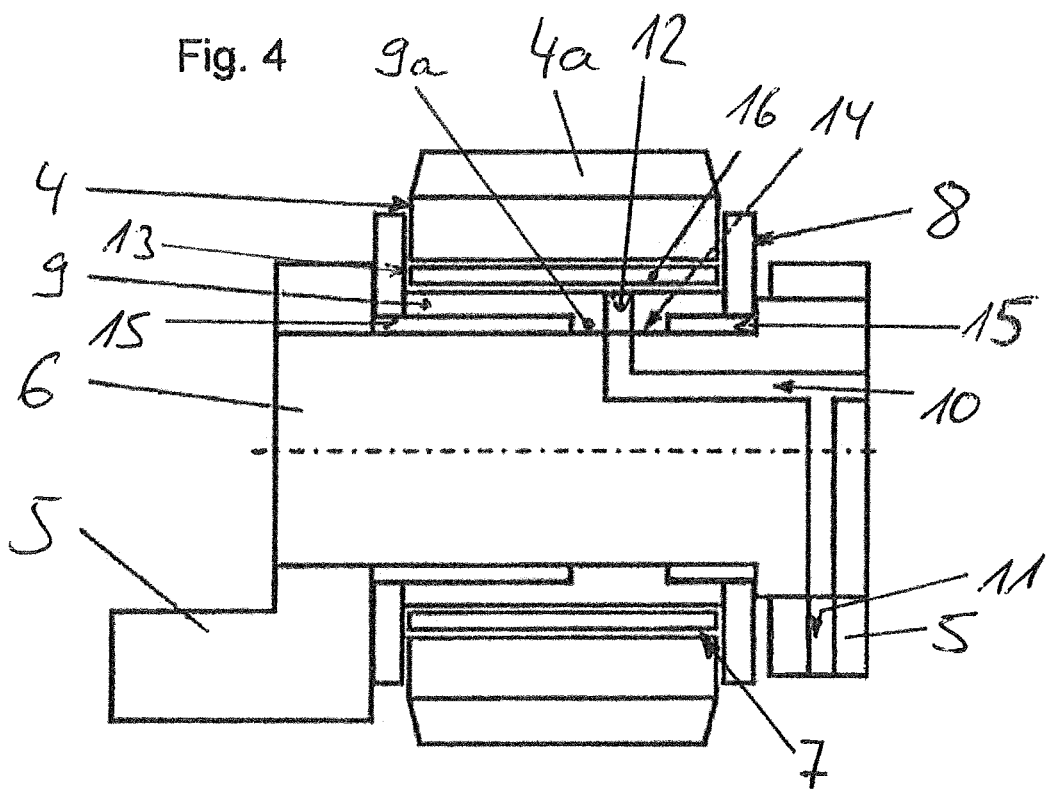
FIG. 4 is a detail of a transmission.

FIG. 4 shows a further version of a transmission according to the invention, wherein in FIG. 4 a floating bush 16 is positioned between the bearing hub 9 and the planet gear 4, which is rotationally moveable both relative to the bearing hub 9 and also to the planet gear 4. Preferentially, the floating bush is embodied from a slide bearing material.

In this case, a coating of the bearing hub 9 with a slide bearing material or the embodiment of the bearing hub 9 of a slide bearing material can be omitted under certain conditions.

Figure 5:
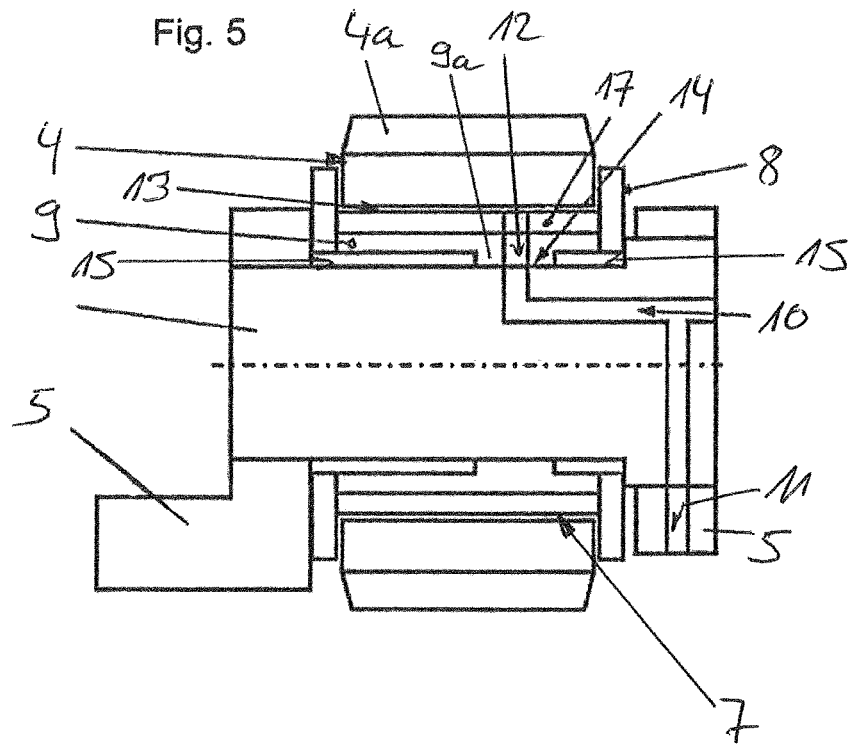
FIG. 5 is a detail of a transmission.

FIG. 5 shows a design of a transmission according to the invention, in which between the planet gear 1 and the bearing hub 2 a slide bearing bush 17 is positioned, which in the shown exemplary embodiment is non-rotatably connected to the bearing hub 9. This slide bearing bush 17 is then preferentially produced from a slide bearing material or comprises a coating of a slide bearing material on a side facing the planet gear 4.

In contrast with the exemplary embodiment shown in FIG. 5 it is also possible that a slide bearing bush is non-rotatably connected to the planet gear 4.

With respect to all remaining details, the exemplary embodiments of FIG. 4, 5 in turn correspond to the exemplary embodiment of FIG. 1 so that here, too, same reference numbers are used for same assemblies to avoid unnecessary repetitions.

Figure 6:
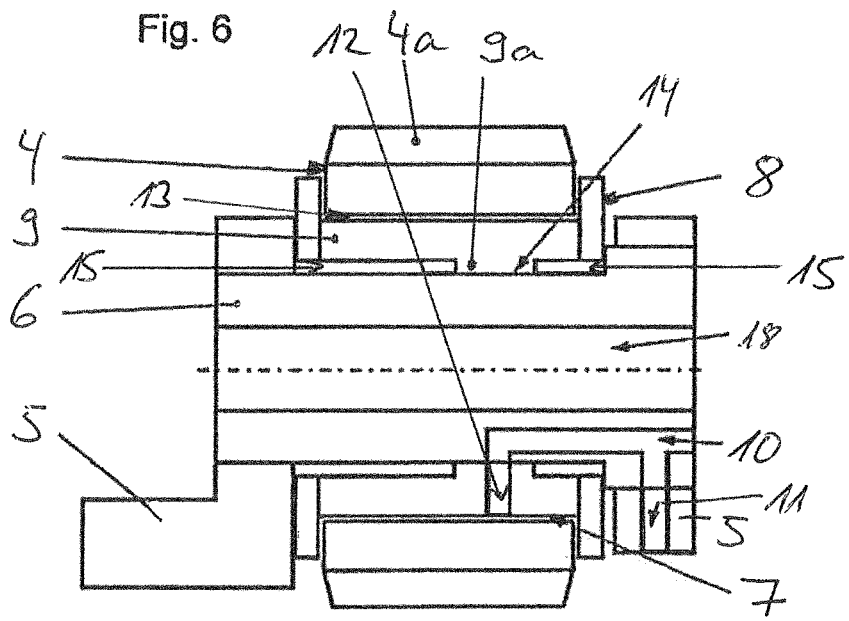
FIG. 6 is a detail of a transmission.

FIG. 6 shows a configuration of a transmission according to the invention, namely a further development of the exemplary embodiment of FIG. 1, wherein in FIG. 6 a recess 18 extending in the axial direction is introduced into the planet pin 6. By way of this recess 18, the planet pin 6 can be embodied particularly soft and light.

Although not shown in FIG. 6, the oil supply of the radial slide bearing 7 in FIG. 6 can be effected via the recess 18.

In FIG. 6, the recess 18 axially extends completely through the planet pin 6. It is also possible to form a recess each on one side or on both sides which extends in the axial direction into the planet pin 6 in sections.

Accordingly, all exemplary embodiments have in common that the bearing hub 9 flexibly supports itself radially on the planet pin 6 via an annular support 14 and is non-rotatably connected to the planet pin 6. Preferentially, the support 14, based on the actual width of the bearing hub 9 and based on the axial width of the planet gear 4 is formed off centre, preferentially via a protrusion 9a directed radially to the inside of the elastically deformable bearing hub 9 and/or a protrusion 6a directed radially to the outside of the planet pin 6. Under load, the planet gear teeth 4a of the respective planet gear 4 optimally mesh with the sun gear teeth 2a and the ring gear teeth 3a, by way of this a largely optimised load distribution can be ensured in the intermeshing teeth and in the radial slide bearing in different operating states. Load-induced deformations of planet pin 6 and/or planet gear 4 and/or planet carrier 5 can be offset.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed:

1. A transmission for wind power generators, comprising:
  an epicyclic planetary gear arrangement having:
    a sun gear with sun gear teeth;
    a ring gear with ring gear teeth;
    multiple planet gears having planet gear teeth that are in mesh with the sun gear teeth and the ring gear teeth; and
    a planet carrier;
    a plurality of radial slide bearings, each radial slide bearing comprising a bearing hub positioned between a respective planet pin and a respective planet gear and non-rotatably connected to the respective planet pin,
    wherein each planet gear is rotatably mounted via a respective radial slide bearing on a planet pin that is non-rotatably connected to the planet carrier, and
    an annular support formed between a respective bearing hub and the respective planet pin, which seen in an axial direction, has a smaller dimension that the respective bearing hub and/or a smaller dimension than the planet gear teeth of the respective planet gear forming a radially extending gap between each axial end of the respective annular support and the respective planet pin,
    wherein the respective bearing hub is configured to be elastically deformed in a radial direction in those regions in which the annular support is not formed.

2. The transmission according to claim 1, wherein the annular support based on an axial dimension of the respective bearing hub and/or of the planet gear teeth of the respective gear is formed off center.

3. The transmission according to claim 2, wherein the annular support is formed by a protrusion of the respective bearing hub circulating in a circumferential direction, which supports itself on the respective planet pin.

4. The transmission according to claim 2, wherein the annular support is formed by a protrusion of the respective planet pin circulating in a circumferential direction, which supports itself on the respective bearing hub.

5. The transmission according to claim 1, further comprising:
  a floating bush is rotationally moveable relative to the respective bearing hub and the respective planet gear and is positioned between the respective bearing hub and the respective planet gear.

6. The transmission according to any one of the claim 1, further comprising:
  a slide bearing bush is non-rotatably connected either to the respective bearing hub or to the respective planet gear and is positioned between the respective bearing hub and the respective planet gear.

7. The transmission according to claim 1, wherein at least one recess extending in an axial direction is introduced in the respective planet pin.

8. The transmission according to claim 7, wherein an oil supply of the respective radial slide bearing is effected via the respective recess.

9. The transmission according to claim 1, further comprising axial bearings for axially mounting the respective planet gear on the respective bearing hub.

* * * * *